United States Patent [19]

Endo

[11] Patent Number: 4,535,378

[45] Date of Patent: Aug. 13, 1985

[54] OVERCURRENT DETECTOR FOR AN INVERTER

[75] Inventor: Tamotu Endo, Tokyo, Japan

[73] Assignee: Tokyo Shibaura Denki Kabushiki Kaisha, Kawasaki, Japan

[21] Appl. No.: 547,588

[22] Filed: Nov. 1, 1983

[30] Foreign Application Priority Data

Nov. 16, 1982 [JP] Japan .................... 57-200641
Dec. 17, 1982 [JP] Japan .................... 57-221328
Jun. 28, 1983 [JP] Japan .................... 58-116392

[51] Int. Cl.³ .................................... H02H 7/122
[52] U.S. Cl. ................................ 361/18; 361/87; 363/57
[58] Field of Search ............... 361/18, 87, 93, 100; 363/50, 55, 56, 57

[56] References Cited

U.S. PATENT DOCUMENTS 4,099,225 7/1978 Nygaard .................... 363/56
4,442,480 4/1984 Downhower, Jr. et al. ......... 363/57

FOREIGN PATENT DOCUMENTS 1538153 10/1969 Fed. Rep. of Germany .
725141 3/1980 U.S.S.R. .................... 363/57

*Primary Examiner*—Harry E. Moose, Jr.
*Attorney, Agent, or Firm*—Oblon, Fisher, Spivak, McClelland & Maier

[57] ABSTRACT

An overcurrent detector for an inverter is provided, which detector includes a filter capacitor and snubber circuits, and comprises: a first circuit which detects a current flowing through the DC main circuit of the inverter and provides a first signal in proportion to the magnitude of this current; a second circuit which generates a second signal corresponding to the magnitude of snubber currents flowing through said snubber circuits; and a third circuit which generates a third signal corresponding to the difference between the first signal and the second signal. The third signal is an output signal of the overcurrent detector, a protection circuit of the inverter being made operative by this third signal.

18 Claims, 25 Drawing Figures

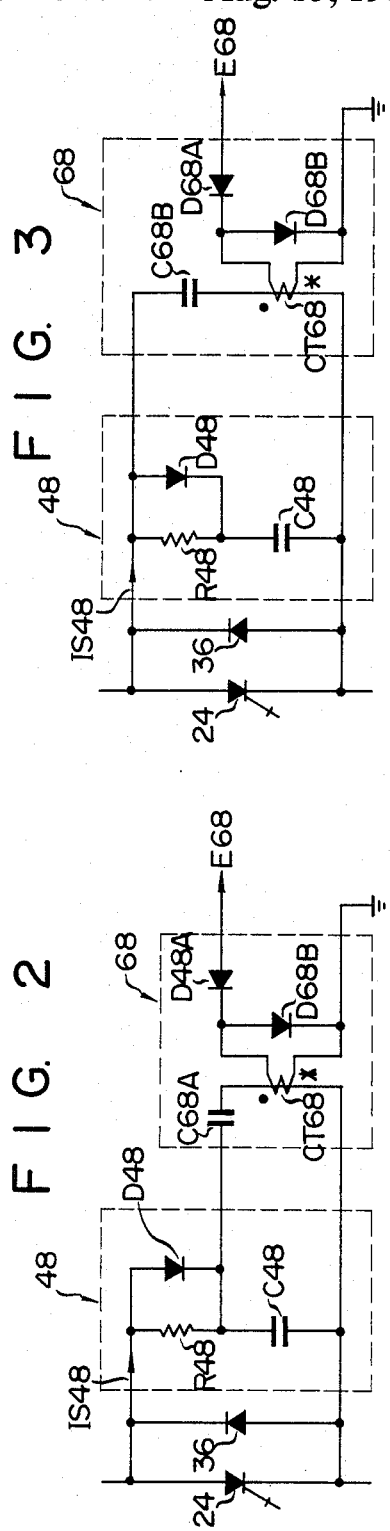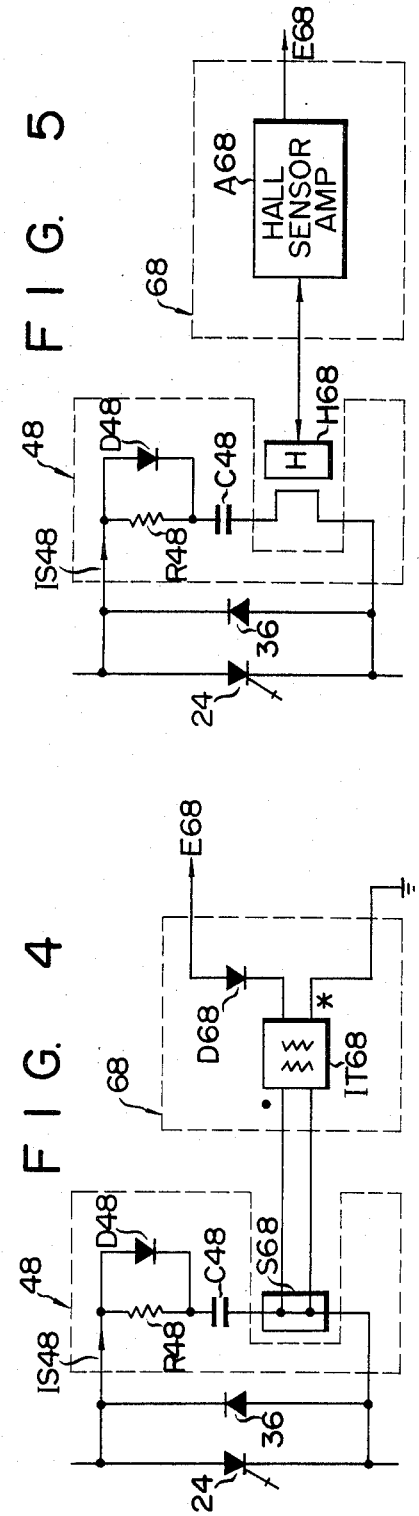

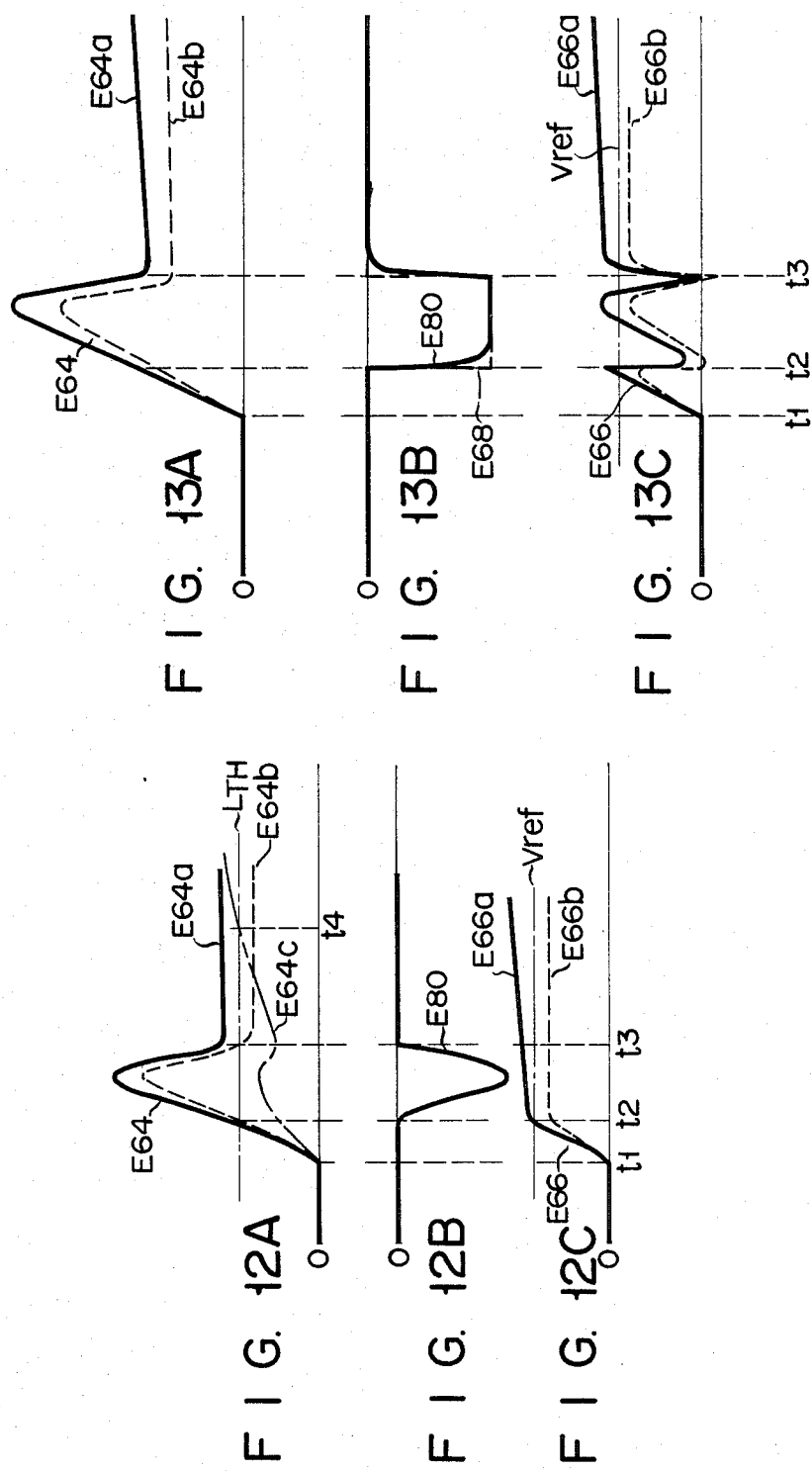

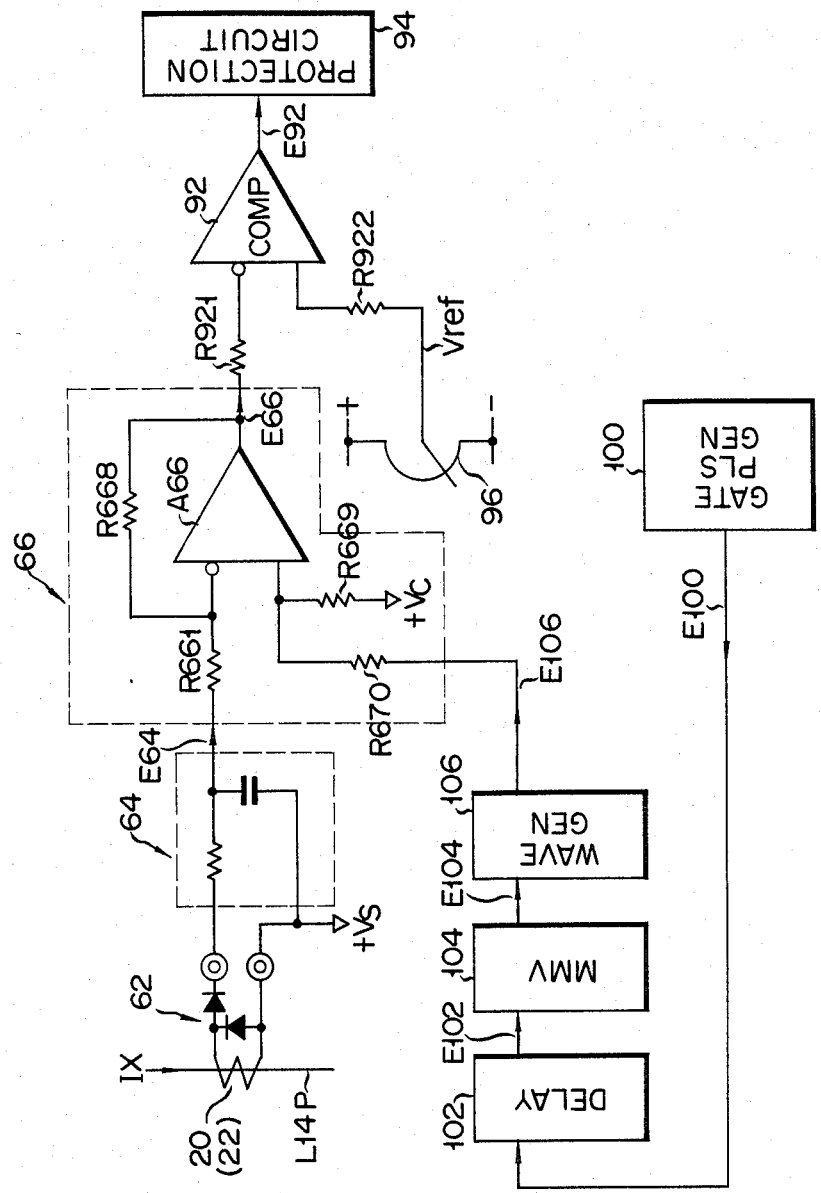
F I G. 14

F I G. 17
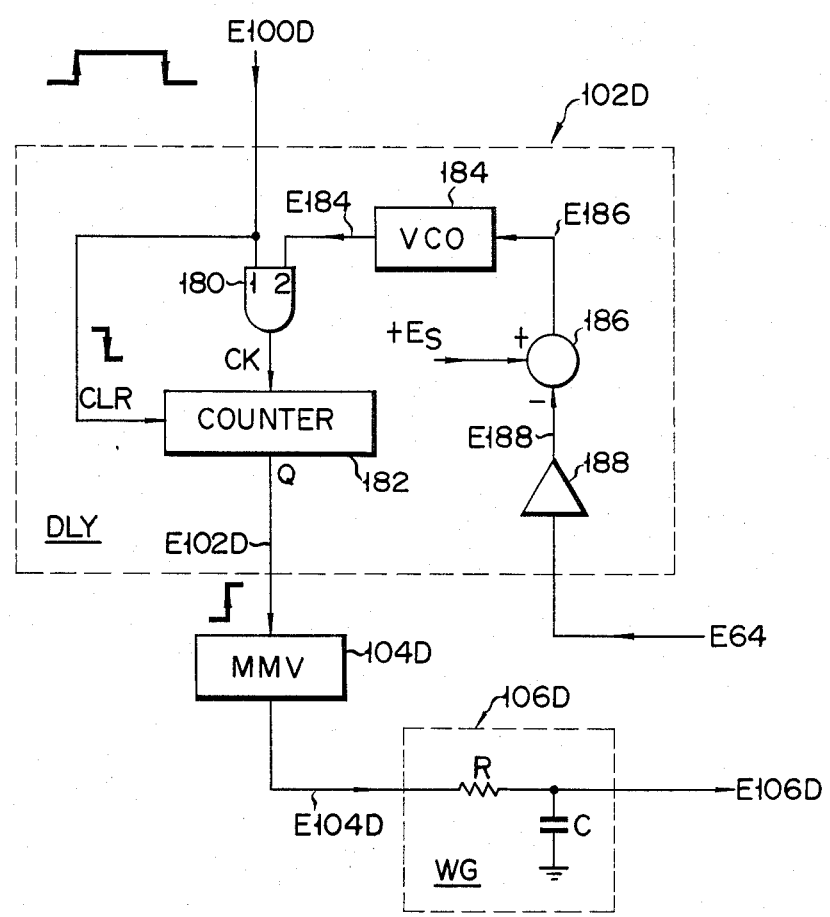

OVERCURRENT DETECTOR FOR AN INVERTER

BACKGROUND OF THE INVENTION

This invention relates to an overcurrent detector for an inverter and, more particularly, to an improvement in the overcurrent detecting speed of an overcurrent detector for a voltage inverter, which voltage inverter is used in the drive control unit of a motor or the like, in driving an AC motor at variable speed.

Conventionally, an inverter is formed of a plurality of switching elements, to each of which elements a snubber circuit is connected in parallel. This snubber circuit is provided to suppress the maximum rise rate of the "off" potential dv/dt applied to the switching element, thereby preventing a malfunction of the switching element. The rate, "dv/dt", as used herein, is defined as follows:

"dv/dt—Minimum rise rate of the peak voltage, with respect to the time required to cause a switching from the off-state to the on-state."

When the dv/dt limit is exceeded, there is a potential danger that the switching element will be turned back on, when it should remain off. Since a snubber circuit includes a capacitor of relatively large capacity, a peak value of a charging current to this capacitor becomes fairly large, although for a short period. Therefore, the peak value of the current of the main circuit of the inverter to which the charging current for the snubber capacitor was added extremely exceeds the safety current value during the period of time when the snubber capacitor is being charged even when the stationary load current of the inverter is not larger than the safety current value. For example, assuming that the DC input voltage of the inverter is 600 V, snubber capacitor is 4 $\mu$F, and series inductance of the filter capacitor of the main circuit is 10 $\mu$H, the peak value of the snubber current is about 300 A and the current waveform width is about 20 $\mu$sec. However, since the large current due to the charge of a snubber capacitor is not caused by abnormality or overload of an inverter, it is undesirable to make an overcurrent detector operative by means of the large current during the period of time when charging the snubber capacitor. Due to this, in a conventional overcurrent detector, a time lag over the snubber capacitor charging period of time would have been caused during the interval from the time when a switching element in the inverter has been switched to the time when an overcurrent is actually detected. Thus, even if an overcurrent actually flows due to, e.g., the commutation-failure (or shoot-through) of the switching element in the inverter, the detecting speed of this overcurrent will be slow with a conventional detector, resulting in low reliability of the protecting operation for the inverter or the load to be connected to the inverter. Particularly, when a gate turn-off thyristor (GTO) is used as a switching element, and an off-gate signal is applied to the GTO when an anode current exceeding its turn-off capability (overcurrent) is flowing, the GTO will be broken, since the dv/dt withstanding capacity is low. Therefore, in an inverter using a switching element having a low dv/dt withstanding capacity, such as a GTO, it is desired to realize the higher-speed overcurrent detecting operation than conventional one.

SUMMARY OF THE INVENTION

The primary object of the present invention is to provide an overcurrent detector for an inverter, in which the detection response properties of an overcurrent are improved.

To accomplish the above object, according to the present invention, charing current components of the snubber capacitor in an overcurrent detection signal are cancelled, thereby detecting the overcurrent (short-circuit current) component which is caused when any abnormal situation occurs in the inverter.

As a method of cancelling the above-mentioned snubber capacitor charging current components, this invention utilizes the following methods:

(1) A detected value of the filter capacitor current of the inverter or a detected value of the DC main circuit current of the inverter, or the like, and a detected value of the snubber capacitor charging current of the inverter are synthesized with appropriate rates by properly subtracting one from the other. In this way, an overcurrent of the inverter main circuit can be detected without influence of the snubber capacitor charging current component.

(2) A detected value of the filter capacitor current of the inverter or a detected value of the DC main circuit current of the inverter, or the like, and a simulated value of the snubber capacitor charging current of the inverter are synthesized with appropriate rates by properly substracting one from the other. In this way, an overcurrent of the inverter main circuit can be detected without substantial influence of the snubber capacitor charging current component.

By adopting either of the above methods (1) and (2), according to the present invention, an overcurrent of the inverter main circuit can be rapidly detected during the period of time when the snubber capacitor charging current is flowing (i.e., without waiting until the snubber capacitor charging current sufficiently reduces). Thus, an overcurrent detector for an inverter having excellent detection response properties is obtained.

BRIEF DESCRIPTION OF THE DRAWINGS

FIG. 2 shows the internal construction of one of the sensors 68 to 78 shown in FIG. 1, in which the charging current of a snubber capacitor C48 is detected by a by-pass capacitor C68A and a current transformer CT68, which are connected in parallel to the snubber capacitor;

FIG. 3 shows a modification of FIG. 2, wherein a snubber capacitor charging current is detected by a by-pass capacitor C68B and a current transformer CT68, which are connected in parallel to a snubber circuit 48 or a thyristor (GTO) 24;

FIG. 4 shows another modification of FIG. 2, wherein a snubber capacitor charging current is detected by means of a shunt S68 and an isolating transformer IT68, which are coupled to the current path of the snubber capacitor C48;

FIG. 5 shows still another modification of FIG. 2, wherein a snubber capacitor charging current is detected by a Hall element H68 coupled to the charging current path of the snubber capacitor C48, and by a Hall sensor amplifier A68 for biasing the Hall element and amplifying the Hall output voltage;

FIGS. 12A to 12C show waveform diagrams which are used to describe the operation of the circuit of FIG. 10, in which FIG. 12A shows a waveform (E64) corresponding to the current of the inverter main circuit, FIG. 12B shows a waveform (E80) after filtering the detection signal corresponding to the snubber capacitor charging current with reference to one of the snubber circuits, and FIG. 12C shows the waveform of a detection signal (E66) corresponding to the difference between the waveform of FIG. 12A and the waveform of FIG. 12B;

FIGS. 13A to 13C show waveform diagrams which are used to describe the operation of the circuit of FIG. 11, in which FIG. 13A shows a current waveform (E64) of the inverter main circuit, FIG. 13B shows a detection signal (E68) to be caused due to the snubber capacitor charging current with reference to one snubber circuit and a waveform (E80) after filtering the detection signal (E68), and FIG. 13C shows the waveform of a detection signal (E66) equivalent to the difference between the waveform of FIG. 13A and the waveform of FIG. 13B;

FIG. 14 shows the configuration of an overcurrent detector according to another embodiment of this invention, in which a signal corresponding to the snubber capacitor charging current is simulated;

FIGS. 16A to 16E show waveform diagrams which are used to describe the operation of the circuit of FIG. 14 (or FIG. 15), in which FIG. 16A shows a waveform (E64) corresponding to the current of the inverter main circuit FIG. 16B shows a waveform of the output signal E100 (or E100D) of a gate pulse generator (or inverter driver) 100, FIG. 16C shows the waveform of an output signal E104 (or E104D) of a monostable multivibrator 104, FIG. 16D shows a waveform of an output signal E106 (or E106D) of waveform generator 106, and FIG. 16E shows a waveform of a detection signal (E66) equivalent to the difference between the waveform of FIG. 16A and the waveform of FIG. 16D; and FIG. 17 is a circuit diagram showing concrete constructions with respect to each of the delay circuits 102 and waveform generators 106 shown in FIG. 15.

DETAILED DESCRIPTION OF THE PREFERRED EMBODIMENTS

Figure 1:
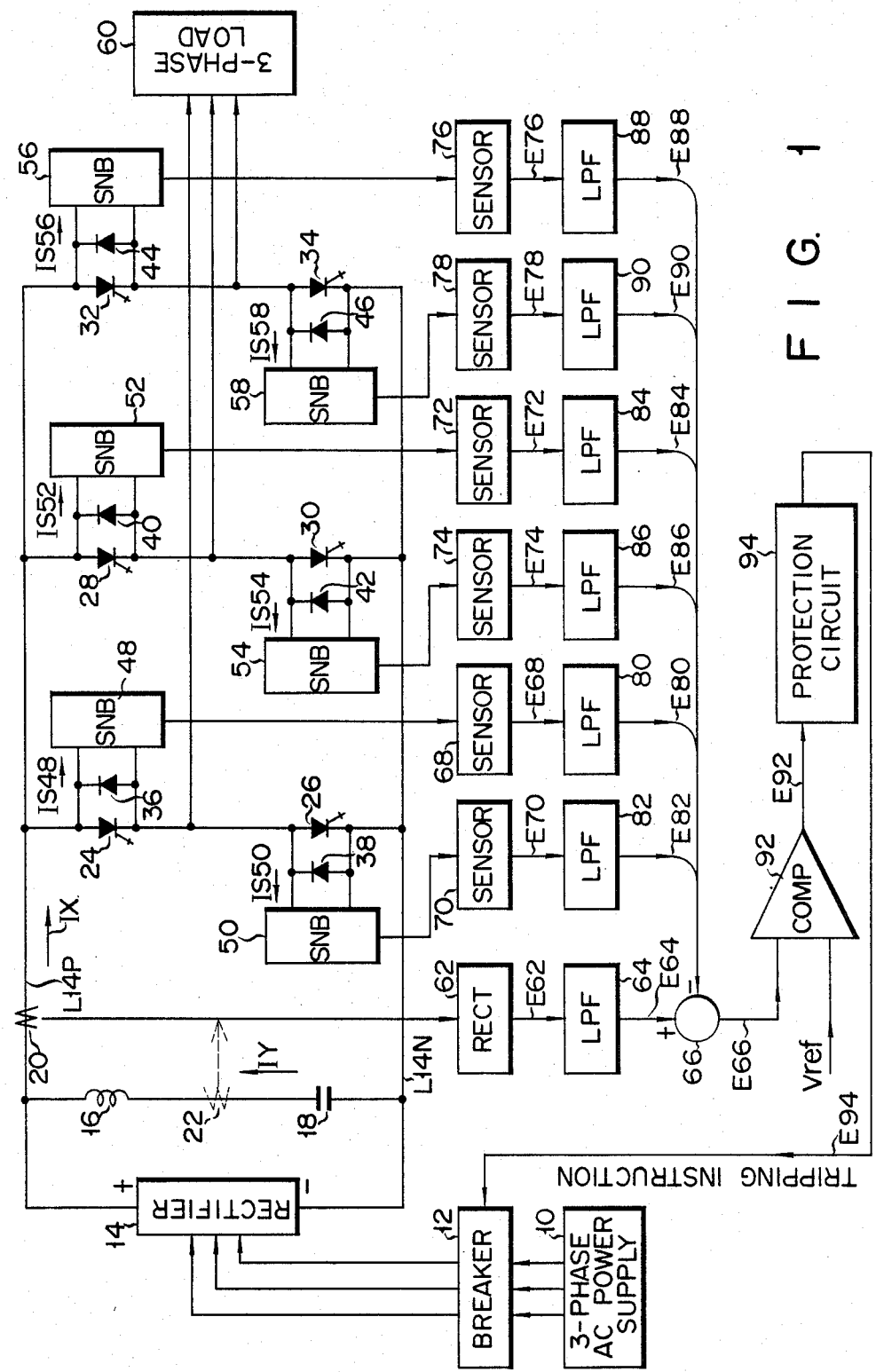
FIG. 1 shows the configuration of a voltage inverter including an overcurrent detector according to an embodiment of the present invention.

Preferred embodiments of this invention will be described hereinbelow, with reference to the drawings. In description, common elements in each of a plurality of drawings are designated by common reference numerals and will not be described any further for simplicity.

FIG. 1 shows a voltage inverter including an overcurrent detector according to one embodiment of the present invention. Although this invention can be applied to any inverters other than 3-phase AC inverter, only the 3-phase type will be described here.

An AC output of a 3-phase AC power supply 10 is applied, through a breaker 12, to a rectifier 14. Rectifier 14 is constituted by a diode bridge, thyristor bridge, or the like. Breaker 12 may be a conventional no fuse breaker, but a breaker with a higher breaking speed, if possible, is more preferable. This breaker 12 serves to break a 3-phase AC power supply circuit by a trip instruction E94 from a protection circuit 94 which will be described later.

A positive rectified output of rectifier 14 is connected to a positive line L14P of a DC main circuit, and its negative rectified output is connected to a negative line L14N of the DC main circuit. Positive line L14P is coupled to negative line L14N through a power inductor 16 and a filter capacitor 18. A current transformer 20 is coupled to positive line L14P. If necessary, a current transformer 22 coupled to the charging and discharging current path of filter capacitor 18 may be used. Only one of these current transformers 20 and 22 may be provided. Current transformer 20 may be coupled to negative line L14N side.

Positive line L14P is coupled to negative line L14N, through gate turn-off transistors (GTOs) 24 and 26. A series circuit of GTOs 28 and 30 and a series circuit of GTOs 32 and 34 are connected in parallel to the series circuit of GTOs 24 and 26. These GTOs may be replaced by SCRs, bipolar transistors, or other switching elements. Diodes 36 to 46 for passing a circulating current of the inverter, etc., are cross-coupled to each of GTOs 24 to 34. Snubber circuits 48 to 58 are coupled to each of GTOs 24 to 34. The connection node of GTOs 24 and 26, the connection node of GTOs 28 and 30, and the connection node of GTOs 32 and 34 are connected to a 3-phase load (e.g., 3-phase induction motor) 60.

An output of current transformer 20 (or 22) is inputted to a rectifying circuit 62. A rectified output E62 from circuit 62 is inputted to a low-pass filter (LPF) 64. A time constant of LPF 64 is set to a rather smaller value such that the peak component of rectified output E62 caused by a snubber current (which will be described later) can pass through LPF 64. By the operation of LPF 64, high frequency noise components other than DC main circuit current and snubber current components are eliminated from the filtered output E64.

Each of snubber circuits 48 to 58 includes a snubber capacitor. Charging currents (snubber currents) IS48 to IS58 to these snubber capacitors flow into snubber circuits 48 to 58, respectively. Sensors 68 to 78 for detecting snubber currents IS48 to IS58 are coupled to snubber circuits 48 to 58, respectively. Detected outputs E68 to E78 of sensors 68 to 78 are inputted to LPFs 80 to 90, respectively. Each time constant of LPFs 80 to 90 is selected to such a magnitude that the phase of the peak waveform of filtered output E64 due to the snubber current substantially coincides with the phase of the peak waveform of each of filtered outputs E80 to E90. High frequency noise components other than the snubber current components which are included in detected outputs E68 to E78 are cut by LPFs 80 to 90.

Filtered output E64 from LPF 64 is applied to a + input terminal of a subtractor 66, and filtered outputs E80 to E90 from LPFs 80 to 90 are applied to a − input terminal of this subtractor 66. Circuit 66 outputs a differential signal E66 which is obtained by subtracting signals (E80 to E90) at the − input terminal from signal (E64) at the + input terminal (If the polarity of filtered output E64 is opposite to each polarity of filtered output E80 to E90, an adder is used as circuit 66). Differential signal E66 is inputted to a comparator 92. A reference voltage Vref is applied to comparator 92 to discriminate whether the potential of signal E66 indicates an overcurrent or not. When the potential of signal E66 exceeds Vref, comparator 92 acts to give an overcurrent detection signal E92 to protection circuit 94. When protection circuit 94 receives this signal E92, it sends trip instruction E94 to breaker 12 and also performs other protecting operations (e.g., sends gate-off signal to all of GTOs 24 to 34, and the like), if necessary.

Protection circuit 94 may be of the same or similar configuration disclosed in the following U.S. Patents:
(1) No. 3,312,864-patented on Apr. 4, 1967,
(2) No. 3,471,729-patented on Oct. 7, 1969.

The entire content of the disclosures of the above two USPs are incorporated herewith.

FIG. 2 shows the construction of one (68) of the sensors 68 to 78 shown in FIG. 1. The other sensors 70 to 78 have the same construction as sensor 68.

An anode of GTO 24 is coupled to its cathode, through a diode D48 and a snubber capacitor C48. A resistor R48 is connected in parallel to diode D48. These elements R48, D48 and C48 constitute snubber circuit 48 for GTO 24. Each of snubber circuits 50 to 58 of FIG. 1 also has the same construction as the snubber circuit of FIG. 2. The connection node of capacitor C48 and a cathode of diode D48 is coupled via a by-pass capacitor C68A to the connection node of capacitor C48 and the cathode of GTO 24. Current transformer CT68 is coupled to the connection line (charging current path of capacitor C68A) of capacitor C68A and GTO 24. The capacitance CX68A of capacitor C68A may be enough smaller than the capacitance CX48 of capacitor C48. Now, assuming that the current ratio of current transformer 20 is N1 and the current ratio of a current transformer CT68 is N2, and that the following relation holds:

$$(CX48 + CX68A) \times N1 = CX68A \times N2 \qquad (1)$$

Then, it is possible to make the magnitude of the respective snubber current components of rectified output E62 and that of detected output E68 substantially identical. By doing this, if outputs E62 and E68 are oppositely polarized, the snubber current component can be cancelled from output E62 by merely adding outputs E62 and E68. Of course, even if E62≠E68 with respect to the snubber current component, proper selection of the subtraction synthesis ratio in cancel circuit (66) enables the snubber current component to be canceled; therefore; the relation of expression (1) is not always absolute.

Current transformer CT68 generates a voltage signal of which the side marked by * becomes positive when a current flows from capacitor C68A to the cathode side of GTO 24. Such a current flows when snubber charging current IS48 flows from the anode of GTO 24 through diode D48 to snubber capacitor C48. This voltage signal is outputted as detection signal E68 having a negative potential through diode D68A to the outside of sensor 68. When the current flows from the cathode side of GTO 24 to capacitor C68A, a voltage signal of which the side marked by * of current transformer CT68 becomes negative is generated. This voltage signal is shorted by diode D68B and is also blocked by diode D68A, so that no detection signal E68 will be generated. That is, only when snubber charging current IS48 flows through capacitor C48, detection signal E68 having the negative potential of the magnitude in proportion to this current IS48 is obtained (Of cource, it is posssible to obtain detection signal E68 having positive potential by reversing the polarities of current transformer CT68 and diodes D68A and D68B).

FIG. 3 shows a modification of FIG. 2. In this drawing, a by-pass capacitor C68B is connected in parallel to the series circuit of diode D48 and capacitor C48. Current transformer CT68 is coupled to the charging current path of capacitor C68B. The capacitance of capacitor C68B may be so small as to be 1/10 or less of the capacitance of capacitor C48. When snubber current IS48 flows from the anode of GTO 24 into snubber circuit 48, part of its current passes through capacitor C68B and flows to the cathode side of GTO 24. At this time, detection signal E68 having the negative potential in proportion to snubber current IS48 is obtained.

FIG. 4 shows another modification of FIG. 2. In this drawing, a shunt S68 is coupled to the charging current path of snubber capacitor C48. As this shunt S68, a shunt with extremely low impedance (low DC resistance, low inductance) should be used to prevent impedance increase of the charging current path of snubber capacitor C48. Snubber current IS48 detected by shunt S68 is applied to a primary coil of an isolating transformer IT68. Transformer IT68 has a DC isolating function between the inverter and the overcurrent detection circuit. When current IS48 flows, the voltage signal of which the side * of the secondary coil of transformer IT68 becomes positive is output from transformer IT68. This voltage signal is introduced as detection signal E68 having a negative potential from sensor 68 through diode D68.

FIG. 5 shows still another modification of FIG. 2. In this drawing, a Hall element H68 is used, which is magnetically coupled to the charging current path of snubber capacitor C48. Hall element H68 is DC-biased by a Hall sensor amplifier A68. when snubber current IS48 flows, the magnetic field corresponding to this current IS48 occurs in a certain location of Hall element H68. At this time, Hall element H69 biased by amplifier A68 serves to detect the magnetic field corresponding to current IS48, thereby applying the Hall voltage in proportion to the magnitude of current IS48 to amplifier A68. Then, negative (or positive) detection signal E68 in proportion to this Hall voltage or to snubber current IS48 is outputted from amplifier A68.

Figure 6:
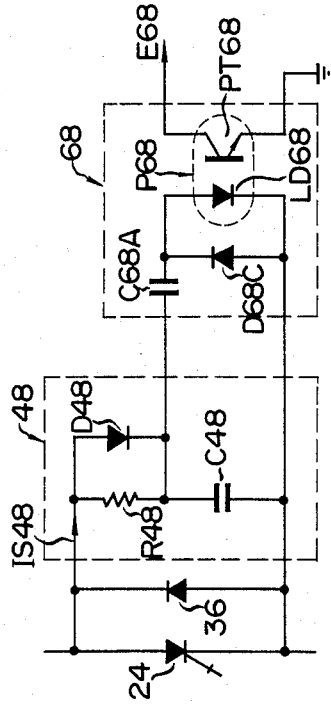
FIG. 6 shows a further modification of FIG. 2, wherein a snubber capacitor charging current is detected by a by-pass capacitor C68A and a photo coupler P68, which are connected in parallel to the snubber capacitor C48.

FIG. 6 shows a still further modification of FIG. 2. The construction of FIG. 6 is equivalent to the construction in which current transformer CT68 of FIG. 2 is replaced by a photo coupler P68. Namely, a light emitting diode LD68 which is forwardly biased by the charging current of capacitor C68A is interposed between by-pass capacitor C68A of small capacitance and GTO 24. A protection diode D68C is cross-coupled to diode LD68 to prevent the damage of diode LD68 caused by an excessive reverse biases voltage. Diode D68C is also used to form the discharging current path of capacitor C68A. Any resistor having proper value may be substituted for this diode D68C. Diode LD68 is optically coupled to a photo transistor PT68. Light emitting diode LD68 and photo transistor PT68 constitute photo coupler P68. Transistor PT68 outputs current signal E68 in proportion to the light emission intensity of diode LD68 or snubber current IS48. When the collector of transistor PT68 is pulled up to the positive power potential through a load resistor (not shown), voltage detection signal E68 which becomes low potential in response to an increase of snubber current IS48 is obtained.

Figure 7:
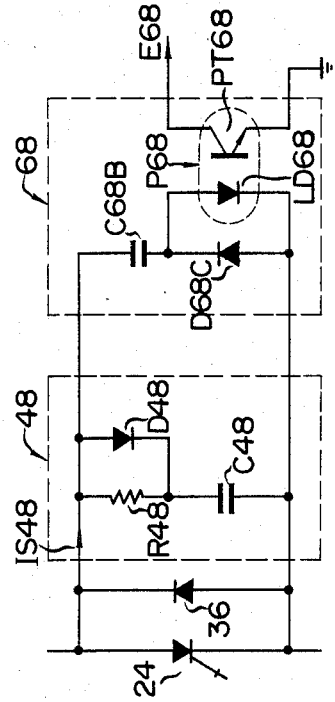
FIG. 7 shows a still further modification of FIG. 2, wherein a snubber capacitor charging current is detected by a by-pass capacitor C68B and a photo coupler P68, which are connected in parallel to the snubber circuit 48.

FIG. 7 shows another modification of FIG. 2. The construction of FIG. 7 is equivalent to the construction in which the current transformer CT68 of FIG. 3 is replaced by photo coupler P68. The connecting method of photo coupler P68 is similar to the case of FIG. 6. Namely, when light emitting diode LD68 emits light due to the charging current of by-pass capacitor C68B, photo transistor PT68 outputs detection signal E68.

Figure 8:
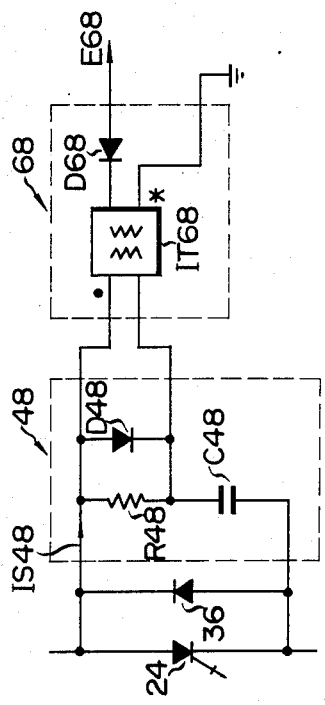
FIG. 8 shows still another modification of FIG. 2, wherein a voltage drop caused at a diode D48 or a resistor R48 which is connected in series to the snubber capacitor C48 is sensed through an isolating transformer IT68, and a snubber capacitor charging current is detected from the output voltage of the transformer IT68.

FIG. 8 shows still another modification of FIG. 2, in which the primary coil of isolating transformer IT68 in connected in parallel to the diode D48 and resistor R48 of snubber circuit 48. Negative detection signal E68 is outputted from the secondary coil of transformer IT68 through diode D68. It is preferable that the primary impedance of transformer IT68 is as high as possible, since the electrical interference to snubber circuit 48 becomes smaller.

Figure 9:
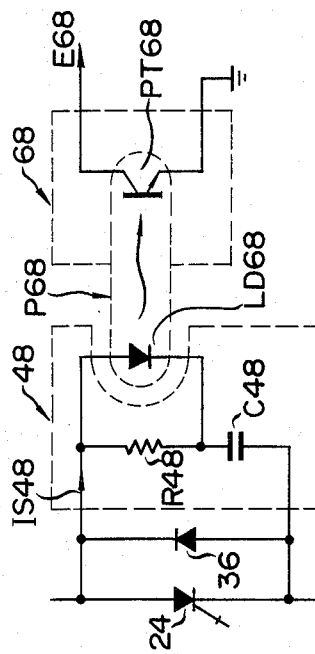
FIG. 9 shows yet another modification of FIG. 2, wherein a light emitting diode in the photo coupler P68 is connected in parallel to the resistor R48 connected in series to the snubber capacitor C48, and a snubber capacitor charging current is detected from the current flowing through said light emitting diode.

FIG. 9 shows yet another modification of FIG. 2, in which the light emitting diode LD68 of photo coupler P68 is used as a diode of snubber circuit 48. When snubber current IS48 flows, part of current IS48 which was shunted by resistor R48 flows through light emitting diode LD68. Then, diode LD68 emits and detection signal E68 is outputted from photo transistor PT68. If the reverse withstanding voltage of diode LD68 is too small, a diode with high withstanding voltage (not shown) may be connected in series to diode LD68.

Figure 10:
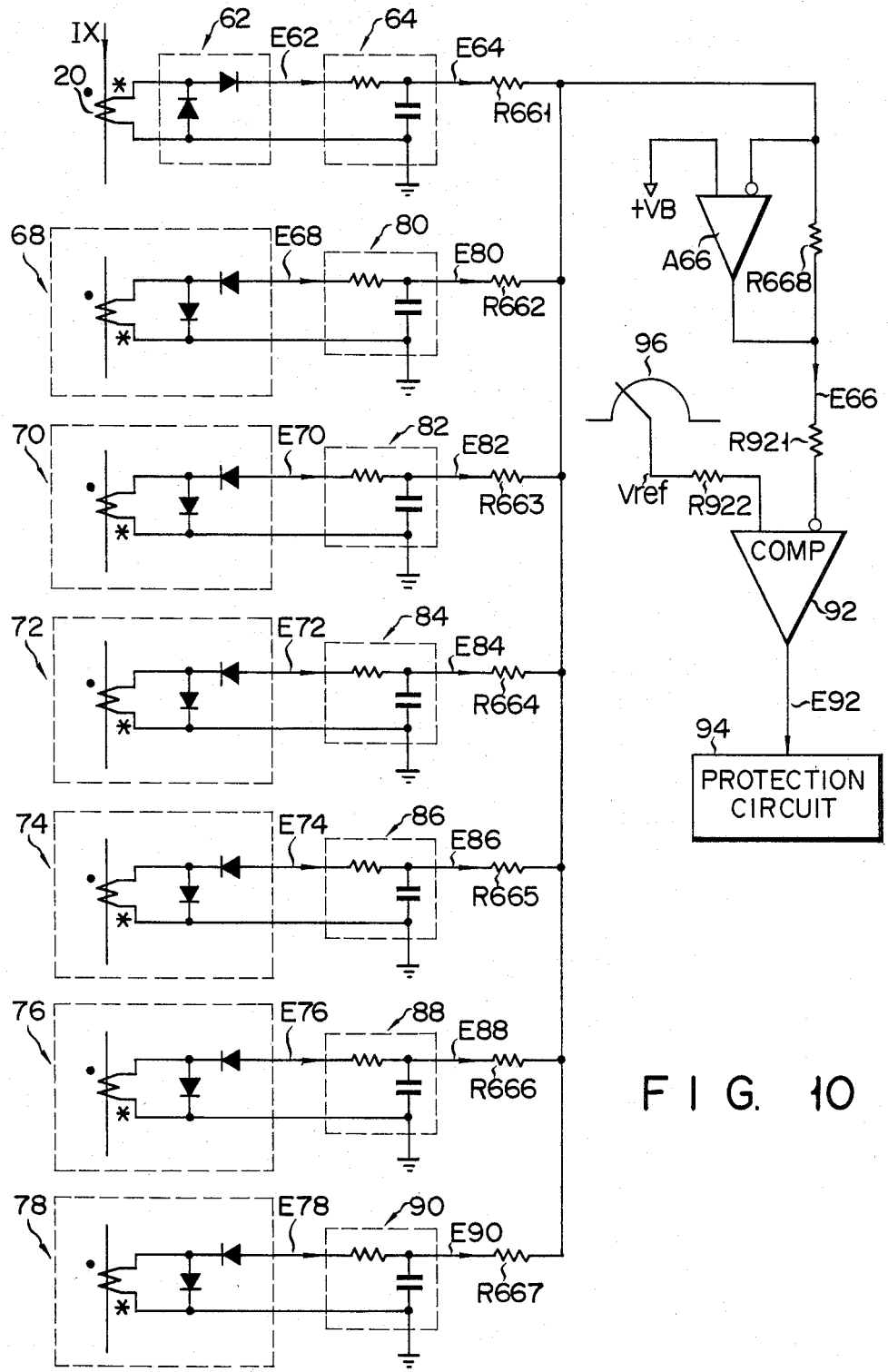
FIG. 10 is a circuit diagram showing the main part of the configuration of FIG. 1 more concretely, using the sensors 68 to 78 having the construction of FIG. 2.

FIG. 10 shows an example in the case wherein sensors 68 to 78 having the construction of FIG. 2 are applied to the configuration of FIG. 1. A main circuit current IX of the inverter is converted into a voltage signal by current transformer 20, and this voltage signal is converted into positive DC detection signal E62 by rectifier 62. High frequency noises included in signal E62 are eliminated by LPF 64. Output E64 from LPF 64 is inputted to an inverted input terminal of an operational amplifier (OP amp) A66 through a resistor R661. Snubber currents IS48 to IS58 of each of snubber circuits 48 to 58 shown in FIG. 1 are converted by sensors 68 to 78 into negative DC detection signals E68 to E78. Respective high frequency noises of signals E68 to E78 are eliminated by LPFs 80 to 90. Outputs E80 to E90 from LPFs 80 to 90 are respectively applied to an inverted input terminal of OP amplifier A66 through resistor R662 to R667.

If all of the sensors 68 to 78 consist of parts of the same construction, the same constants of LPFs 80 to 90 are all set in such a way as to be indentical and resistors R662 to R667 are also set to be identical. The time constant of LPF64 is selected to be the magnitude such that the phase of the snubber current component of signal E64 substantially coincides with those of signals E80 to E90. The magnitude of resistor R661 is so selected that the snubber current component (positive) of signal E64 is cancelled by signals E80 to E90 (negative).

The non-inverted input terminal of OP amplifier A66 in connected to a circuit having proper offset bias potential +VB. The output terminal of OP amplifier A66 is coupled to its inverted input terminal through a feedback resistor R668. OP amplifier A66 functions as an inverting amplifier and outputs the signal E66 in inverse proportion to the potential difference between signal E64 and signals E80 to E90. This signal E66 is inputted to the inverted input terminal of comparator 92 through a resistor R921. A reference voltage Vref (reference level) is applied from a potentiometer 96 through a resistor R922 to the non-inverted input terminal of comparator 92. The value of reference voltage Vref can be set into an optional value by the adjustment of potentiometer 96. Comparator 92 can be constituted by an OP amplifier having inverted/non-inverted inputs.

The output of comparator 92 is at a zero or negative potential when the potential of signal E66 is higher than voltage potential Vref (E66>Vref). When main circuit current IX does not exceed the upper limit of safety current, this relation "E66 >Vref" is satisfied. If main circuit current IX exceeds the safety current limit, the potential of signal E64 rises and the potential of signal E66 which is the phase-inverted output thereof drops, so that E66<Vref. Then, comparator 92 applies overcurrent detection signal E92 having positive potential to protection circuit 94. That is to say, at the moment when main circuit current IX exceeds a predetermined current value to be determined by voltage potential Vref, overcurrent detection signal E92 which rises from logic level "0" to logic level "1" is generated.

Figure 11:
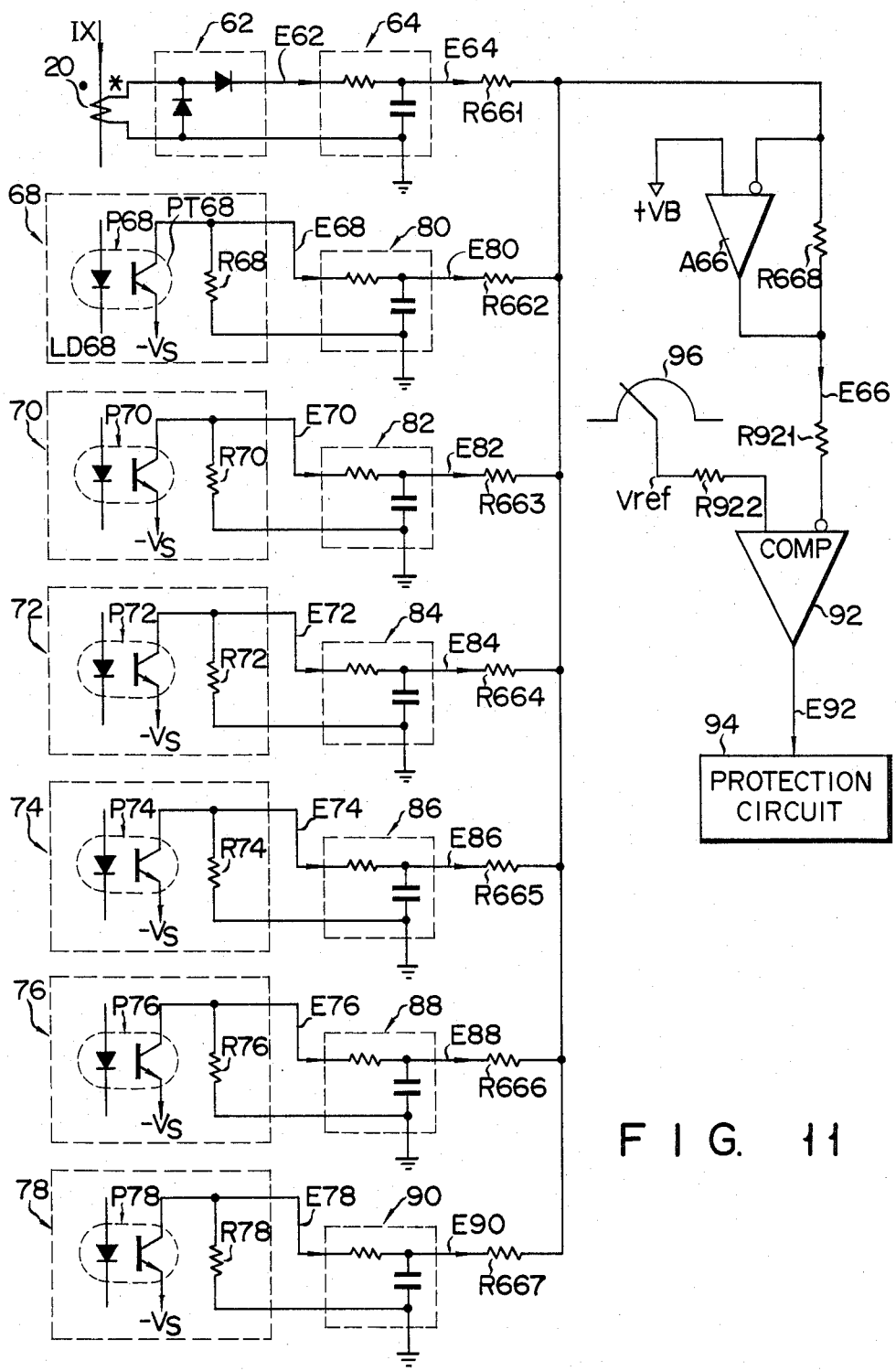
FIG. 11 shows a modification of FIG. 10, wherein the construction of FIG. 6 is utilized as the sensors 68 to 78.

FIG. 11 shows a modification of FIG. 10. In this drawing, the sensors having the construction of FIG. 6 are used as sensors 68 to 78. Since sensors 68 to 78 all have the same construction, the circuit connection will be described with respect only to sensor 68. When part of the snubber charging current flows through photo diode LD68 in photo coupler P68, diode LD68 emits light, causing photo transistor PT68 to be turned on. The collector of transistor PT68 is coupled to the circuit ground through load resistor R68 and a negative voltage −Vs is applied to the emitter thereof. Thus, when transistor PT68 is turned on, its collector potential drops from zero to −Vs. This collector potential drop becomes negative detection signal E68. This negative signal E68 becomes signal E80 through LPF 80. Signal E80 (negative) acts to cancel the snubber current component corresponding to signal E80 in output signal E64 (positive) from LPF 64.

FIGS. 12A to 12C show waveforms at the main parts of FIG. 10. It is now considered that, as a snubber charging current, the current IS48 flowing into the snubber circuit 48 of FIG. 1 is a typical current of whole snubber currents. In this case, main circuit current IX has a waveform representing a combination of components of snubber current IS48 and the stationary load current. FIG. 12A shows the waveform of signal E64 corresponding to this main circuit current IX. In FIG. 12A, time t1 indicates the time point at which GTO 26 of FIG. 1 is turned on when a load current is flowing through diode 36. Time t2 of FIG. 12A represents the time point at which diode 36 is turned off and, accordingly, snubber current IS48 starts flowing. Time t3 denotes the time point at which the charging of snubber capacitor C48 is completed and current IS48 returns to zero. The peak waveforms occurring during the period of times t2 to t3 (FIG. 12A) are caused by snubber current IS48.

FIG. 12B shows the waveform of the signal E80 corresponding to the snubber current IS48. The peak waveform component of signal E64 is canceled by signal E80 having almost symmetrical waveform to this peak waveform according to the operation of subtractor 66 in FIG. 1 or of elements R661, R662, R668, and A66 in FIG. 10. Thus, the waveform of output signal E66 from circuit 66 or OP amplifier A66 becomes the form as shown in FIG. 12C. The waveform of FIG. 12C is obtained when the waveform of FIG. 12B was subtracted from the waveform of FIG. 12A. Namely, signal E66 becomes the signal which does not include the component of snubber current IS48 but represents only the load current component.

Signals E64, E66 corresponding to the main circuit current $IX_a$ exceeding the safety current upper limit $IX_O$ of the inverter are designated as E64a, E66a, with signals E64, E66 corresponding to the main circuit current $IX_b$ of not larger than $IX_O$ being designated as E64b, E66b, and the levels $L_{TH}$ of signals E64, E66 corresponding to $IX_O$ are represented as Vref. Then, as shown in FIG. 12A, in the case where the peak component due to the snubber current is not cancelled, it is impossible to detect overcurrent signal E64a (E64a > $L_{TH}$) until time t3. However, as shown in FIG. 12C, in the case where the snubber current component was cancelled, overcurrent signal E66a can be detected (E66a > Vref) at time t2.

In the conventional overcurrent detector which differs from the present invention, the time constant of LPF 64 becomes extremely large, since it is necessary to suppress the peak component of FIG. 12A. The waveform of signal E64 in this case becomes such a waveform E64c indicated by the alternate long and one short dash line of FIG. 12A, for example. As a result, the overcurrent detecting point (the point when E64c = $L_{TH}$) becomes time t4 which is far behind time t3. Although the time interval from a reference time t1 (0 second) to any of times t2 to t4 varies depending upon the actual cases, it is obvious that time t2 is much earlier than time t4. That is, according to the present invention, an overcurrent can be detected undoubtedly faster than the conventional detector.

FIGS. 13A to 13C show waveforms at the main parts of FIG. 11. FIG. 13A shows the waveform of the signal E64 corresponding to the main circuit current IX. FIG. 13B shows the waveforms of signal E68 corresponding to snubber current IS48 and of a filtered output E80 of signal E68. FIG. 13C shows the waveform (E66) corresponding to the difference between the waveform (E64) of FIG. 13A and the waveform (E80) of FIG. 13B. In FIG. 11, when photo coupler P68 performs an on/off switching operation, signal E80 becomes a rectangular wave (FIG. 13B). In this case, the waveform of signal E66, after cancelling the snubber current compenent, becomes complex (FIG. 13C). However, after E66 > Vref was once detected (after t2), if this detection result is memorized by an one-shot or a flip-flop, etc., a temporary fluctuation of the waveform of signal E66 (during the interval of t2 to t3) will not be concerned with the detection of overcurrent. As can be seen from FIG. 13C, according to the construction of FIG. 11, an overcurrent of the inverter main circuit can be detected at or before time t2.

FIG. 14 shows another embodiment of this invention. In FIG. 1, 10 or 11; to cancel the peak waveform of signal E64 as shown in FIG. 12A or 13A, which is caused by the snubber charging current, snubber current IS48 (or any of IS48 to IS58) is actually detected. On the other hand, as shown in FIG. 14, a signal serving to cancel the peak waveform of signal E64 is generated without detecting actual snubber currents IS48 to IS58.

In FIG. 14, current IX (or the filter capacitor current IY of FIG. 1) of DC main circuit L14P is converted into positive signal E64, through current transformer 20 (or 22), rectifying circuit 62 and LPF 64. This signal E64 is inputted to the inverted input terminal of OP amplifier A66 through resistor R661 in the negative feedback branch. The non-inverted input terminal of OP amplifier A66 is pulled up to the positive potential +Vc through a resistor R669 and at the same time receives a simulation signal E106 for cancelling the snubber current component in signal E64 through a resistor R670.

Simulation signal E106 is synthesized in the following manner. Firstly, a timing signal E100 is generated from a gate pulse generator 100, simultaneously, when any of the GTOs 24 to 34 in FIG. 1 is turned on. Signal E100 is delayed by a predetermined time period, by delay circuit 102, in such a way as to comprise a delay signal E102. Although not shown, circuit 102 may consist of, e.g., a CR integrating circuit and a comparator for generating a logic "1" signal when the output potential of this integrating circuit exceeds a prescribed value. Delay signal E102 serves to trigger a monostable multivibrator (one-shot) circuit 104. The triggered monostable multivibrator 104 generates a gate signal E104 having a predetermined pulse width. Gate signal E104 is then converted into the previously mentioned simulation signal E106 by a waveform generator 106. This generator 106 can be constituted by simple CR integrating circuits.

The time constant of monostable multivibrator 104 is so selected that the pulse width of gate signal E104 corresponds to the time width of the peak wave (snubber component) of signal E64. The delay amount of the signal produced by delay circuit 102 is so selected that the peak wave of signal E64 and simulation signal E106 are substantially in-phase. Waveform generator 106 is constituted in such a manner that the waveform of simulation signal E106 is almost indentical; or, is at least similar, to the waveform of the peak wave of signal E64.

Figure 15:
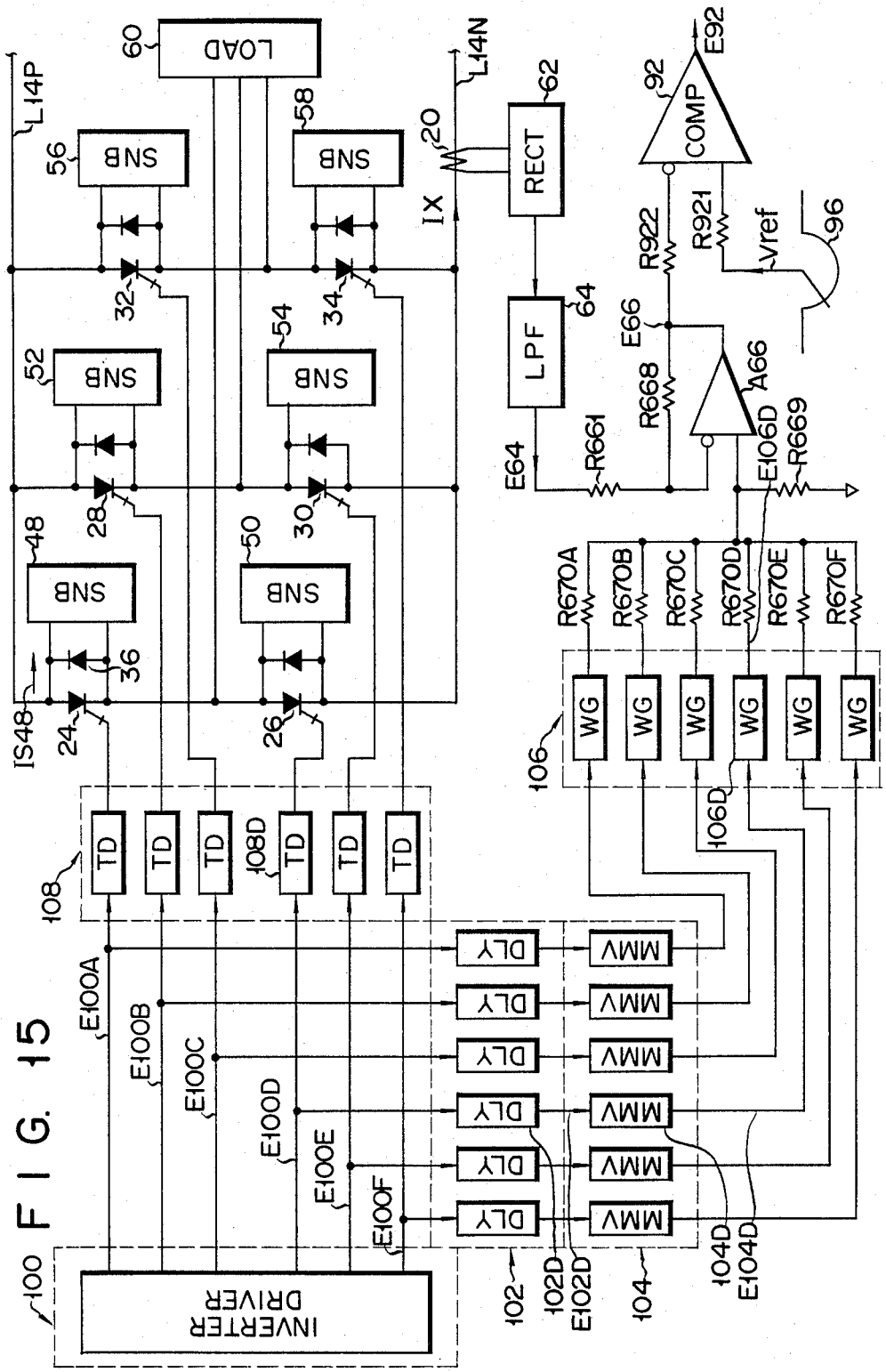
FIG. 15 shows the configuration of the main part of the invention, in the case wherein the configuration of FIG. 14 is applied to a 3-phase inverter.

FIG. 15 shows a concrete example in the case wherein the construction of FIG. 14 is applied to a 3-phase inverter. Refer to FIG. 1 for the other construction of the inverter which has been omitted from FIG. 15.

In FIG. 15, GTOs (or thyristors) 24 to 34 are driven by a thyristor drive circuit 108 consisting of six thyristor drivers (TDs). Input signals E100A to E100F to the six drivers in drive circuit 108 are supplied from an inverter driver 100. Inverter driver 100 has a function as gate pulse generator 100 of FIG. 14. Namely, signals E100A to E100F are equivalent to timing signal E100 of FIG. 14. The constructions of inverter driver 100 and thyristor drive circuit 108 may be conventional.

Six timing signals E100A to E100F are respectively applied to the non-inverted input terminal of OP amplifier A66, through six delay elements, six monostable multivibrators, six waveform generators and six resistors R670A to R670F. The six delay elements constitute delay circuit 102 of FIG. 14, the six monostable multivibrators constitute monostable multivibrator 104 of FIG. 14, and six waveform generators constitute waveform generator 106 of FIG. 14. Six resistors R670A to R670F correspond to a resistor R670 of FIG. 14.

In FIG. 15, although main circuit current IX is detected by the current transformer 20 coupled to negative line L14N, this detection may be done by means of either positive line L14P or negative line L14N. signal E64 corresponding to main circuit current IX is applied to the inverted input terminal of OP amplifier A66 through resistor R661. The construction subsequent to the output of OP amplifier A66 is identical to that of FIG. 14.

The six elements which respectively constitute delay circuit 102, monostable multivibrator 104 and waveform generator 106 of FIG. 15 may all be identical. Therefore, one delay element 102D, one monostable multivibrator 104D and one waveform generator 106D will be described hereinbelow.

Figure 16:
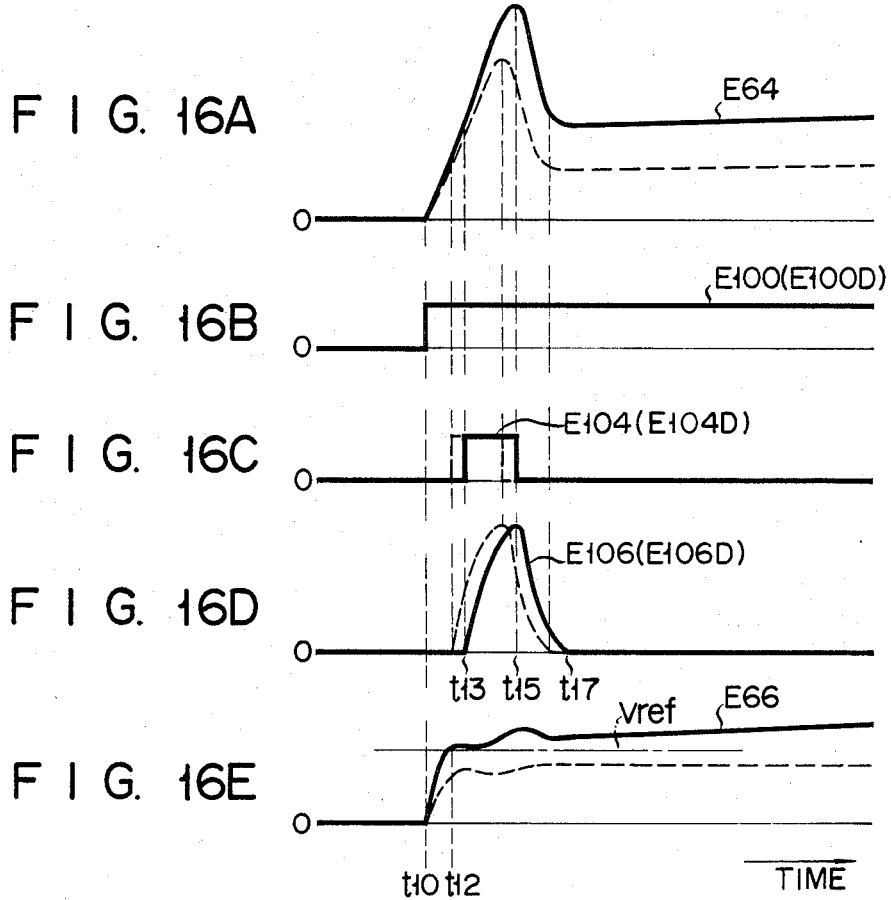

FIGS. 16A to 16E show waveforms at the main portions of FIG. 15. It is now assumed that a thyristor driver 108D turns GTO 26 on by timing signal E100D (FIG. 16B). It is also assumed that a snubber current IS48 is flowed through a snubber circuit 48 by the turn-off of diode 36. Signal E64 at this time includes the peak waveform corresponding to snubber current IS48 (FIG. 16A). It will be described hereinafter how a simulation signal E106D for cancelling this peak waveform is synthesized.

Firstly, a timing signal E100D serving to turn GTO 26 on reaches the logic "1" level (at time t10 in FIG. 16B). Then, when diode 36 is turned off, the potential of signal E64 starts rising (around t12 in FIG. 16A). The leading edge of signal E100D is delayed by a fixed time period by delay element 102D. The leading edge thus delayed of signal E102D serves to trigger monostable multivibrator 104D. At this time, multivibrator 104D generates gate signal E104D having fixed pulse width (at t13 to t15 in FIG. 16C). This gate signal E104D is converted into simulation signal E106D by waveform generator 106D (at t13 to t17 in FIG. 16D). In the case where generator 106D is a CR integrating circuit, a capacitor C of this CR integrating circuit is charged during the high-level period of time (t13 to t15) of a signal E104D, so that the potential of signal E106D exponentially rises. This capacitor C is discharged in the low-level period (after time t15) of signal E104D and the potential of signal E106D exponentially drops. Then, signal E106D of the waveform shown in FIG. 16D is synthesized.

When the phase of signal E106D coincides with the phase of the peak waveform portion of signal E64, the waveform of signal E106D is similar to the peak waveform of signal E64, and the subtraction synthesis ratio of signal E106D and the signal E64 in OP amplifier A66 is suitable, then the peak component in signal E64 (i.e., the snubber current component) is eliminated from the output signal E66 of OP amplifier A66 (FIG. 16E). In this way, use of the signal E66 in which the snubber component was cancelled enables the detection of an overcurrent at a high rate of speed. As shown in FIG. 16E, if the overcurrent detection level is Vref, overcurrent detection signal E92 can be generated at time t12.

FIG. 17 shows concrete examples of delay element 102D and waveform generator 106D shown in FIG. 15. Particularly, in FIG. 17, the delay amount of delay element 102D is varied in accordance with the magnitude of main circuit current IX (or filter capacitor current IY). From this, since the magnitude of signal E64 changes, even if the phase of the peak waveform of signal E64 changes, it is possible to change the phase of simulation signal E106D in compliance with this change of phase, so that the snubber current component is preferably cancelled.

Timing signal E100D is inputted to a first input terminal of an AND gate 180 and to a clear input terminal (CLR) of a counter 182. An oscillated output E184 from a voltage-controlled oscillator (VCO) 184 is inputted to a second input terminal of AND gate 180. The oscillating frequency of VCO 184 is proportional to the DC potential of an output signal E186 from a differential circuit 186. Signal E186 is equal to the difference (Es−E188) between a reference potential +Es and a DC potential E188 which is proportional to the potential of signal E64. Potential E188 is outputted from a buffer amplifier 188 which receives signal E64. Namely, when reference potential +Es is fixed, the frequency of oscillated output E184 decreases with an increase of the potential of signal E64. On the contrary, when the potential of signal E64 decreases (or main circuit current IX becomes small), potential E186 rises and the frequency of oscillated output E184 becomes high.

Immediately after being cleared by the leading edge of signal E100D, counter 182 starts counting the oscillated output E184 passed through AND gate 180. When counter 182 is counted up, it outputs the carry-out. This carry-out becomes signal E102D to trigger monostable multivibrator 104D. It is now assumed that counter 182 is a 4-bit binary counter and includes a register (flip-flop) for holding the carry-out after count-up. It is also assumed that the frequency of oscillated output E184 is 1.6 MHz. Then, counter 182 generates signal E102D when oscillated output E184 has generated 16 ($=2^4$) pulses, i.e., when 10 μsec ($=16/1.6$ MHz) has elapsed, after AND gate 180 has been opened. Monostable multivibrator 104D generates a rectangular waveform-like gate signal E104D having a pulse width of, e.g., 10 μsec, when it is triggered by the leading edge of signal E102D. This signal E104D is converted into simulation signal E106D by waveform generator 106D consisting of a CR integrating circuit having a time constant of, e.g., about 10 μsec.

As shown by the borken line of FIG. 16A, the case may now be considered wherein the potential of signal E64 has dropped, due to a decrease in the main circuit current IX. The oscillating frequency of VCO 184 rises, for example, from 1.6 MHz to 2 MHz, due to this voltage drop. Then, 4-bit binary counter 182 outputs signal E102D in 8 μsec ($=2^4/2$ MHz) afer it was cleared. Thus, the delay time of delay element 102D is shortened from 10 μsec. At this time, gate signal E104D and simulation signal E106D are also delayed by only 8 μsec from the leading point (t10 in FIG. 16B) of timing signal E100D (as indicated by the broken lines of FIGS. 16C and 16D).

As described above, if the delay time of signal E102D is changed in accordance with the level of signal E64, the phase of the peak waveform of signal E64 can be followed by the phase of simulation signal E106D. Therefore, irrespective of the magnitude of main circuit current IX, signal E66 for detection of an overcurrent can be obtained without being substantially affected by the snubber current component (FIGS. 16A and 16E).

In addition, by replacing VCO 184 of FIG. 17 by an oscillator having a fixed oscillating frequency, it is possible to obtain a delay element 102D whose delay time is constant.

The embodiments described above do not limit the appended claims of the present invention. For example, the signal corresponding to the main circuit current IX of the inverter may be detected from the current flowing through the power supply line to load 60 of FIG. 1. Waveform generator 106D, as shown in FIG. 17, may consist of an LR or LCR circuit, as well as a CR circuit. Waveform generator 106 (106D, etc.) may be constituted by using the diode tangential approximating method employed in the sine wave synthesis circuit (or the like) of a function generator; or, a waveform converting method, with the aid of the non-linearity of the V-I characteristic of a semiconductor, etc. In FIGS. 14, 15 and 17, the actual output of monostable multivibrator 104 (104D) may be utilized as simulation signal E106 (E106D) (the waveform of signal E66 in this case being as shown in FIG. 13C). In the simulation signal synthesizing method shown in FIG. 14, coincidence between the signal width and phase of signal E106, and the peak width and phase of signal E64, is far more significant than the similarity between the waveform of simulation signal E106 and the peak waveform of signal E64.

What is claimed is:

1. An overcurrent detector for an inverter, which includes a filter capacitor and a snubber circuit, comprising:
   first means for detecting a current flowing through the DC main circuit of said inverter or a current flowing through said filter capacitor, and for providing a first signal in proportion to the magnitude of said current;
   second means for generating a second signal corresponding to the magnitude of a snubber current flowing through said snubber circuit; and
   third means for generating a third signal corresponding to the difference between said first and second signals, said third signal being an output signal of said overcurrent detector and being utilized for the purpose of protecting the operation of said inverter.

2. A detector according to claim 1, wherein said second means includes:
   a sensor circuit which detects said snubber current and provides a signal in proportion to the magnitude of said snubber current as said second signal.

3. A detector according to claim 1, wherein said second means includes:
   a simulation circuit which detects the generation timing of said snubber current and simulates a signal of the magnitude in substantially proportion to the magnitude of this snubber current synchronously with said snubber current generation timing, thereby providing this simulated signal as said second signal.

4. A detector according to claim 1, wherein said inverter includes a plurality of switching elements and a plurality of snubber circuits to be coupled to each of these switching elements;
   wherein said second means includes a plurality of sensor circuits which individually detect the snubber current of each of said snubber circuits and which provide snubber signals corresponding to each of said snubber currents;
   and wherein said third means includes a circuit which detects the difference between the total components of said snubber signals and said first signal, and which generates said third signal when the magnitude of said difference exceeds a predetermined reference level.

5. A detector according to claim 3, wherein said simulation circuit includes:
   timing means for generating a timing signal synchronized with the trigger timing of the switching element of said inverter;
   delay means, coupled to said timing means, for generating a delay signal when a predetermined time passed after it had received said timing signal;
   gate means, coupled to said delay means, for generating a gate signal after receiving said delay signal; and
   simulation means, coupled to said gate means, for generating a simulation signal having the waveform corresppoding to the waveform of said snubber current after receiving said gate signal, said simulation signal being used as said second signal.

6. A detector according to claim 5, wherein said gate means includes a one-shot circuit which outputs said trigger signal having a predetermined pulse width corresponding to the period of time when said snubber current flows after being triggered by said delay signal;
   and wherein said simulation means includes an integrating circuit having the time constant corresponding to the pulse width of said trigger signal.

7. A detector according to claim 5, wherein said delay means includes:
   detection means for providing a current intensity signal in proportion to the magnitude of the DC main circuit current of said inverter or said filter capacitor current; and
   means for changing said predetermined time period for allowing said delay signal to be generated on the basis of the magnitude of said current inensity signal.

8. A detector according to claim 6, wherein said delay means includes:
   detection means for providing a current intensity signal in proportion to the magnitude of the DC main circuit current of said inverter or said filter capacitor current; and
   means for changing said predetermined time period for allowing said delay signal to be generated on the basis of the magnitude of said current intensity signal.

9. A detector according to claim 2, wherein said snubber circuit includes a snubber capacitor to be coupled to parallel to a switching element which constitutes said inverter;
   and wherein said sensor circuit includes:
   a by-pass capacitor to be coupled in parallel to said snubber capacitor; and
   a current sensor, coupled to the charging current path of said by-pass capacitor, for generating a detection signal of a magnitude proportionate to the magnitude of the current which flows through said by-pass capacitor and corresponds to said snubber current, said detection signal corresponding to said second signal.

10. A detector according to claim 2, wherein said snubber circuit includes a snubber capacitor and a diode to be connected in series to said snubber capacitor, the series circuit of said snubber capacitor and diode being coupled in parallel to a switching element which constitutes said inverter;
   and wherein said sensor circuit includes:

a by-pass capacitor to be coupled in parallel to said series circuit; and a current sensor, coupled to the charging current path of said by-pass capacitor, for generating a detection signal of a magnitude proportionate to the magnitude of the current which flows through said by-pass capacitor and corresponds to said snubber current, said detection signal corresponding to said second signal.

11. A detector according to claim 2, wherein said snubber circuit includes a snubber capacitor to be coupled in parallel to a switching element which constitutes said inverter;

and wherein said sensor circuit includes:

a shunt to be provided in the charging current path of said snubber capacitor; and means for generating a detection signal of the magnitude in proportion to the magnitude of the current which flows through said shunt and corresponds to said snubber current, said detection signal corresponding to said second signal.

12. A detector according to claim 2, wherein said snubber circuit includes a snubber capacitor to be coupled in parallel to a switching element which constitutes said inverter;

and wherein said sensor circuit includes:

a Hall element to be magnetically coupled to the charging current path of said snubber capacitor; and means for applying a prescribed bias to said Hall element and for generating a detection signal of a magnitude proportionate to the magnitude of a charging current of said snubber capacitor from said Hall element, said detection signal corresponding to said second signal.

13. A detector according to claim 2, wherein said snubber circuit includes a snubber capacitor and a diode to be connected in series to said snubber capacitor, the series circuit of said snubber capacitor and diode being coupled in parallel to a switching element which constitutes said inverter;

and wherein said sensor circuit includes means for generating a detection signal of a magnitude proportionate to the magnitude of the voltage drop to be caused across said diode due to said snubber current, said detection signal corresponding to said second signal.

14. A detector according to claim 2, wherein said snubber circuit includes a snubber capacitor and a light emitting element which is connected in series to said snubber capacitor and whose light emission intensity is substantially proportional to the magnitude of the charging current of said snubber capacitor, the series circuit of said snubber capacitor and light emitting element being connected in parallel to a switching element which constitutes said inverter;

and wherein said sensor circuit includes means, optically coupled to said light emitting element, for generating a detection signal in accordance with its light emission intensity, said detection signal corresponding to said second signal.

15. A detector according to claim 9, wherein said current sensor includes a current transformer to be magnetically coupled to the by-pass capacitor charging current path.

16. A detector according to claim 9, wherein said current sensor includes:

a light emitting element, interposed in said by-pass capacitor charging current path, for emitting light of an intensity proportionate to the magnitude of the by-pass capacitor charging current; and a photo sensor element, optically coupled to said light emitting element, for generating a detection signal in accordance with its light emission intensity, said detection signal corresponding to said second signal.

17. A detector according to claim 10, wherein said current sensor includes a current transformer to be magnetically coupled to said by-pass capacitor charging current path.

18. A detector according to claim 10, wherein said current sensor includes:

a light emitting element, interposed in said by-pass capacitor charging current path, for emitting the light of the intensity in proportion to the magnitude of the by-pass capacitor charting current; and a photo sensor element, optically coupled to said light emitting element, for generating a detection signal in accordance with its light emission intensity, said detection signal corresponding to said second signal.

* * * * *